(12) United States Patent
Armstrong et al.

(10) Patent No.: US 10,764,332 B1
(45) Date of Patent: *Sep. 1, 2020

(54) SYSTEMS, METHODS, AND DEVICES FOR SECURELY MANAGING NETWORK CONNECTIONS

(71) Applicant: Snowflake Inc., San Mateo, CA (US)

(72) Inventors: James Calvin Armstrong, Foster City, CA (US); Jonathan Claybaugh, San Francisco, CA (US)

(73) Assignee: Snowflake Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,174

(22) Filed: Apr. 23, 2020

Related U.S. Application Data

(63) Continuation of application No. 16/778,797, filed on Jan. 31, 2020, which is a continuation of application
(Continued)

(51) Int. Cl.
*H04L 29/06* (2006.01)
*H04L 12/26* (2006.01)
(Continued)

(52) U.S. Cl.
CPC .............. *H04L 63/20* (2013.01); *G06F 21/57* (2013.01); *H04L 41/0604* (2013.01); *H04L 41/22* (2013.01); *H04L 43/00* (2013.01); *H04L 43/026* (2013.01); *H04L 43/062* (2013.01); *H04L 43/0811* (2013.01); *H04L 47/10* (2013.01); *H04L 63/0263* (2013.01); *H04L 63/104* (2013.01)

(58) Field of Classification Search
CPC ....... H04L 63/20; H04L 41/22; H04L 63/104; H04L 43/0811; H04L 63/0263; H04L 41/0604; H04L 47/10; H04L 43/00; H04L 43/062; H04L 43/026; G06F 21/57
See application file for complete search history.

(56) References Cited

U.S. PATENT DOCUMENTS 5,983,270 A 11/1999 Abraham et al.
7,631,064 B1 12/2009 Gray
(Continued)

*Primary Examiner* — Cheng-Feng Huang
(74) *Attorney, Agent, or Firm* — Womble Bond Dickinson (US) LLP

(57) ABSTRACT

The disclosure relates generally to methods, systems, and apparatuses for managing network connections. A system for managing network connections includes a storage component, a decoding component, a rule manager component, and a notification component. The storage component is configured to store a list of expected connections for a plurality of networked machines, wherein each connection in the list of expected connections defines a start point and an end point for the connection. The decoding component is configured to decode messages from the plurality of networked machines indicating one or more connections for a corresponding machine. The rule manager component is configured to identify an unexpected presence or absence of a connection on at least one of the plurality of network machines based on the list of expected connections. The notification component is configured to provide a notification or indication of the unexpected presence or absence.

27 Claims, 5 Drawing Sheets

Related U.S. Application Data

No. 15/079,849, filed on Mar. 24, 2016, now Pat. No. 10,594,731.

(51) Int. Cl.
*H04L 12/24* (2006.01)
*H04L 12/801* (2013.01)
*G06F 21/57* (2013.01)

(56) References Cited

U.S. PATENT DOCUMENTS

| | | |
|---|---|---|
| 7,805,752 B2 | 9/2010 | Newstadt et al. |
| 9,344,348 B2 * | 5/2016 | Ivanov .............. H04L 29/12066 |
| 2003/0154399 A1 * | 8/2003 | Zuk ..................... H04L 63/1416 |
| | | 726/11 |
| 2004/0128376 A1 * | 7/2004 | Matsune ................ H04L 63/08 |
| | | 709/223 |
| 2004/0153568 A1 | 8/2004 | Ho et al. |
| 2005/0050202 A1 | 3/2005 | Aiken et al. |
| 2006/0077909 A1 | 4/2006 | Saleh et al. |
| 2007/0177600 A1 | 8/2007 | Suzuki et al. |
| 2007/0189541 A1 | 8/2007 | Lam et al. |
| 2008/0005309 A1 | 1/2008 | Kudo et al. |
| 2008/0133929 A1 | 6/2008 | Gehrmann et al. |
| 2009/0248737 A1 | 10/2009 | Shukla et al. |
| 2010/0333177 A1 * | 12/2010 | Donley ................ G06F 21/6218 |
| | | 726/4 |
| 2011/0149950 A1 * | 6/2011 | Petit-Huguenin ... H04M 7/0084 |
| | | 370/352 |
| 2013/0191537 A1 * | 7/2013 | Ivanov ................ H04L 61/1511 |
| | | 709/224 |
| 2013/0196617 A1 | 8/2013 | Zalmanovitch et al. |
| 2013/0332972 A1 | 12/2013 | Jacobson et al. |
| 2014/0313975 A1 | 10/2014 | Berenberg et al. |
| 2015/0128205 A1 * | 5/2015 | Mahaffey ................ H04L 63/18 |
| | | 726/1 |
| 2015/0218205 A1 | 8/2015 | Cedillo et al. |
| 2017/0163502 A1 * | 6/2017 | MacNeil ................ H04L 43/045 |

* cited by examiner

SYSTEMS, METHODS, AND DEVICES FOR SECURELY MANAGING NETWORK CONNECTIONS

CROSS REFERENCE TO RELATED APPLICATIONS

This application is a continuation of U.S. patent application Ser. No. 15/079,849, entitled "SYSTEMS, METHODS, AND DEVICES FOR SECURELY MANAGING NETWORK CONNECTIONS," filed Mar. 24, 2016, the disclosure of which is incorporated herein by reference in its entirety.

TECHNICAL FIELD

The disclosure relates generally to methods, systems, and apparatuses for securely managing network connections.

BACKGROUND

Computing devices often communicate across networks, such as a local area network (LAN), wide area network (WAN), the Internet, and/or the like. Because computing systems are often used to control important operational systems, store or access confidential data, or perform other important or sensitive functions, security of computer systems is of great importance. In some cases, security may be increased by limiting or controlling which devices or systems with which a specific computing system is allowed to communicate.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
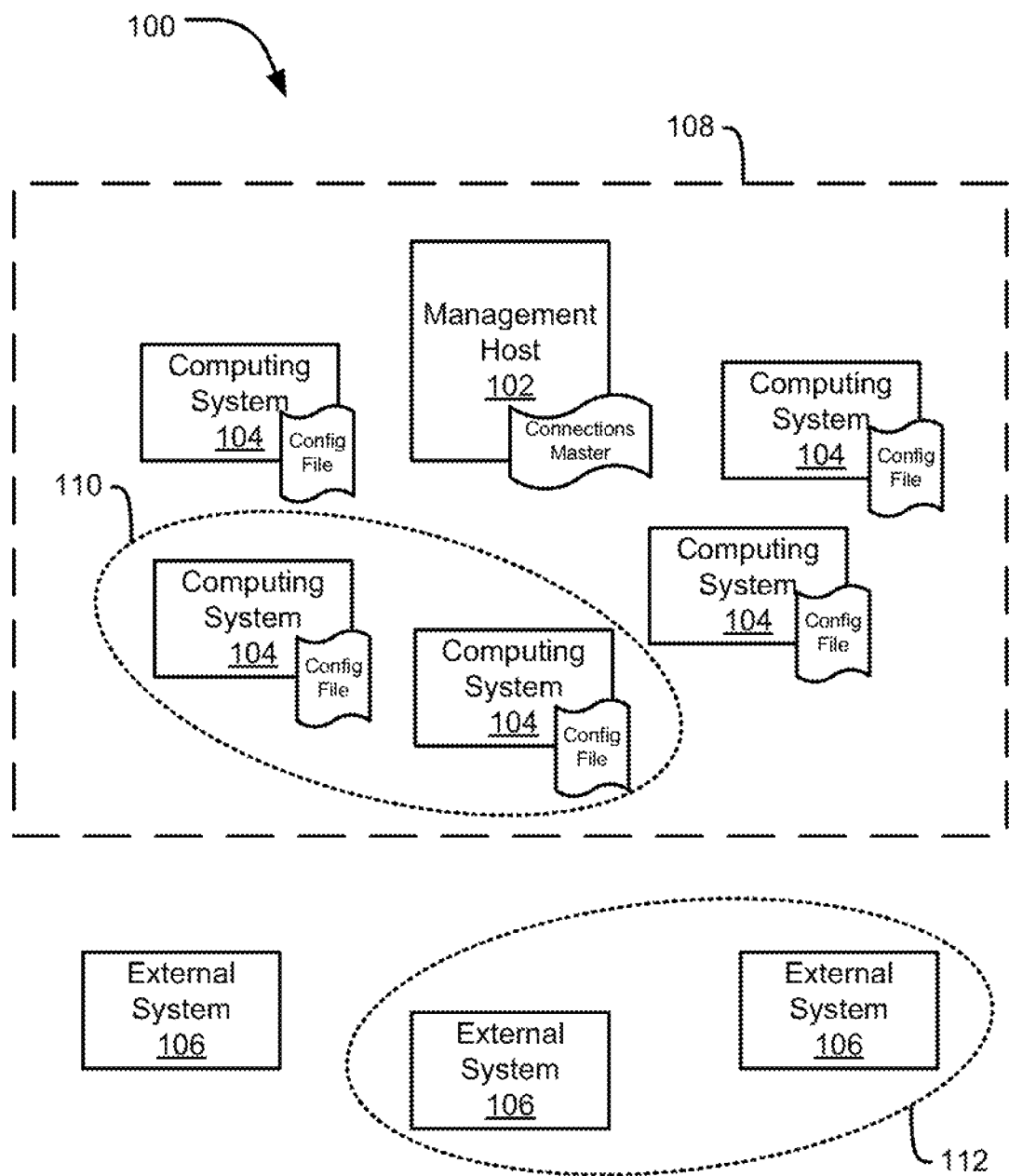
FIG. 1 is a schematic block diagram illustrating an example operating environment for a management host, according to one implementation.

Current approaches to securing a system focus on securing or configuring endpoints of communications. For example, IP tables, a core tool in Linux™ for securing systems, can allow a specific system to deny access to the system based on ports and Internet Protocol (IP) address blocks. Amazon Web Services™ (AWS) provides security groups by specifying allowed connections to and from other security groups, which may include more than one machine or address.

Applicants have recognized that current technologies do not provide an efficient method of confirming that the allowed connections are complete and correct. Within a software product, there may be internal connections between dedicated services that require two endpoints on two or more machines. Because existing technologies are configured on a single endpoint basis, this approach risks mismatched configurations. For example, one machine may be permissive for a connection while the other is not. Amazon provides a tool, CloudFormation™, for the creation of security groups, but it explicitly requires a single end approach. When two security groups are required to communicate, an administrator needs to enter two rules in the template, as stated hi the following quote for AWS Cloud-Formation™:

If you want to cross-reference two security groups in the ingress and egress rules of those security groups, use the AWS::EC2::SecurityGroupEgress and AWS::EC2::SecurityGroupIngress resources to define your rules. Do not use the embedded ingress and egress rules in the AWS::EC2::SecurityGroup. If you do, it causes a circular dependency, which AWS CloudFormation doesn't allow.

Based on the foregoing limitations, Applicants have developed systems, methods, and devices that improve network connection management. Applicants recognized that, in at least one embodiment, managing network communication permissions from the perspective of two endpoints together, rather than managing endpoints separately, leads to greater control and efficiency.

In one embodiment, a system for managing network connections may store a list of expected connections for a plurality of managed machines, devices, or computing systems. For example, the list of expected connections may be stored using a mark-up language or data serialization standard, such as YAML. YAML stands for YAML Ain't Markup Language and aims to be a human readable standard for many or all programming languages. In one embodiment, each connection in the list of expected connections is defined with a starting point, an end point, an IP protocol, and a port number or range of port numbers. The managing system may also include a tool to examine and create necessary permissions at both end points, a tool to validate these connections, and/or a tool to specify mappings, if end points map to multiple machines. One or more of these tools may be used to aggregate connection information on remote machines to a single machine (e.g., the managing system) and the ability to push configurations from the single machine to remote machines.

In one embodiment, a list of expected connections, such as the YAML file describing connections, may be managed as a source code artifact (using any number of source code versioning systems). The most recent version may then be used to validate existing configurations or connections against that defined in the list. In one embodiment, changes made in live configurations can be checked against expected configurations, and alerts generated if the configurations are out of sync.

In one embodiment, a system for managing network connections includes a storage component, a decoding component, a rule manager component, and a notification component. The storage component is configured to store a list of expected connections for a plurality of networked machines. Each connection in the list of expected connections defines a start point and an end point for the connection. The decoding component is configured to decode messages from the plurality of networked machines indicating one or more connections for a corresponding machine. The rule manager component is configured to identify an unexpected presence or absence of a connection on at least one of the plurality of networked machines based on the list of expected connections. The notification component is configured to provide a notification or indication of the unexpected presence or absence.

Referring now to the figures, FIG. 1 illustrates an example system 100 that provides an operating environment for a management host 102. The system 100 includes a plurality of managed computing systems 104 and a plurality of external systems 106. The management host 102 and computing systems 104 may include computing devices such as servers, virtual machines, or any other computing device that make up part of a networked computing system 108. The management host 102 and computing systems 104 of the network computing system 108 may be physically located within the same data center or server farm, or may be located remotely from each other and may be commonly managed by the management host 102. The external systems 106 represent systems that are not managed by the management host 102, and may include computing systems that are located within the same data center or remote from the management host 102. Each of the management host 102, computing systems 104, and external systems 106 may be connected to one or more networks or networking devices, which allow them to communicate with each other. For example, the management host 102, computing systems 104, and external systems 106 may communicate with each other over the Internet, through private networks, or any type of network.

Each of the internal or managed computing systems 104 may store connection configurations, such as in a configuration file, for itself. The connection configurations may be stored in a routing table, IP table, firewall, or any other format or program. The connection configurations may indicate other devices, addresses, or security groups that are allowed to communicate with the computing system 104. The connection configurations may specify a communication direction (e.g., inbound or outbound), address, port number (or range of port numbers), security group identifier, or the like for a specific connection. A security group identifier may include a name, number or other identifier that corresponds to a plurality of machines or addresses. For example, a first security group 110 includes two managed computing systems 104, and a second security group 112 includes two external systems 106. Thus, a connection entry in a configuration file for a specific computing system 104 may indicate that a computing system is allowed to communicate (either in-bound or out-bound) with any system in the first security group 110 or the second security group 112 without explicitly identifying machines in the security groups. In one embodiment, each computing system 104 only stores configurations for itself.

The management host 102 stores a connections master file, which includes master information for all the managed computing systems 104. For example, the connections master file may include a list of expected connections for all of the managed computing systems 104 in the networked computing system 108. Thus, in one embodiment, the list stores connection information for each of the computing systems 104, such that all of the configurations for the computing systems 104 are stored in the connections master file. The connections master file may be stored based on any file format, such as a markup language or a data serialization standard. According to one embodiment, the connections master file comprises a YAML file.

With the connections master file stored by the management host 102, the management host may then monitor actual configurations for the computing systems 104 (e.g., based on the configuration files). In one embodiment, each of the computing systems 104 may periodically, or in response to a request, send its configuration file to the management host 102. When the configuration files have been received by the management host 102, the management host 102 may compare the configuration files to the connections master file to detect any differences. In one embodiment, the differences may include the presence of an unexpected connection in a configuration file at a computing system. For example, a connection entry in a configuration file may not have a corresponding entry in the connections master file. In one embodiment, the differences may include the absence of an expected connection in a configuration file at the computing system. For example, a connection entry in the connections master file may not have a corresponding entry in the configuration file(s) for the correct one or more computing systems 104.

The differences identified by the management host 102 may indicate that there is an error/omission with either the connections master file or the configuration file(s) for one or more computing systems 104. For example, if there is an unexpected connection in a configuration file (with respect to the connections master file) it may be that the connections master file has been incorrectly configured and the unexpected connection actually should be in the connections master file. On the other hand, the unexpected connection may reflect that the configuration file for the computing system 104 is incorrect and that there is a security risk or operational risk for the computing system.

In one embodiment, the management host 102 and its functions and features may provide significant benefits over other available technologies. For example, existing technologies that are all single end-point based do not have an easy mechanism to monitor existing configurations against expected configurations. Because the management host 102 provides an easy and quick way to monitor and manage connections on a connection basis, rather than on a single end-point basis, the management host 102 increases security and reduces costs in monitoring. Furthermore, these monitoring aspects can act as valid controls for various security certifications, including the Service Organization Control 2 (SOC2) certification and Health Insurance Accountability Act (HIPAA) certification and compliance, for example.

In one embodiment, the management host 102 and connections master file may be used to manage security group configurations in existing cloud services, such as in Amazon's AWS™ accounts. In one example, AWS security groups may be used at endpoints, along with external subnets as required. The connections master file (such as a YAML file) may note that a certain service or machine needs to communicate with another service or machine. Running a rule manager, the management host 102 can ensure that the rule exists at the endpoints. The rule manager may also examine rules in a security group, and delete those rules that are not expected. In one embodiment, the rule manager may operate as a validator (for example, in response to flags when initiating the rule manager) to provide a count of differences between the expected set of rules (e.g., in the connections master file) and the existing rules (e.g., in the configuration files).

For illustration purposes, an example rule might be one that allows external load balancers to talk on a single port to Global Services (GS) instances. An administrator may define a security group prod_elb for the elastic load balancers, and prod_gs for global services, which identify the machines, addresses, identifiers, or the like that belong to each group or service. The rule may be stored in a YAML file as follows:

source: prod_elb
destination: prod_gs
protocol: tcp
service: snowflake_elb

The above rule tells a rule manager (e.g., the management host 102 or a service run on the management host 102) to expect a port, defined as snowflake_elb (e.g., with a value 8084) to be opened with the transmission control protocol (TCP) with an outbound rule on prod_elb to prod_gs, and an inbound rule on prod_gs from prod_elb. A second mapping file may be used to define which machines (e.g., addresses, identifiers, etc.) have the role for Global Services (GS) to include prod_gs as a security group, and load balancers to include prod_elb. Example code for GS may be as follows:

role: GS
groups:
group: prod_gs
group: prod_core

In one embodiment, the role for GS is included with a prod_gs group and a second group, prod_core, for rules shared across all instances. For example, a role may belong to more than one security group (Amazon AWS™ allows up to five security groups on each instance). In one embodiment, the management host may execute a validation program to confirm all GS instances are running with both security groups.

The above example is illustrative only and includes teaching and principles that may be expanded to apply to any multi-endpoint configuration. In one embodiment, the management host 102 may then push (or the managed computing systems 104 may pull) configurations to the end-points. In one embodiment, the actual configuration at an end-point (e.g., a managed computing system 102) may be requested by and/or sent to the management host 102. Furthermore, a wide variety of file format types or communication configurations for end-points are contemplated within the scope of the present disclosure. For example, end-points may each have route tables and may be managed by a single route table manager on a management host 102.

Figure 2:
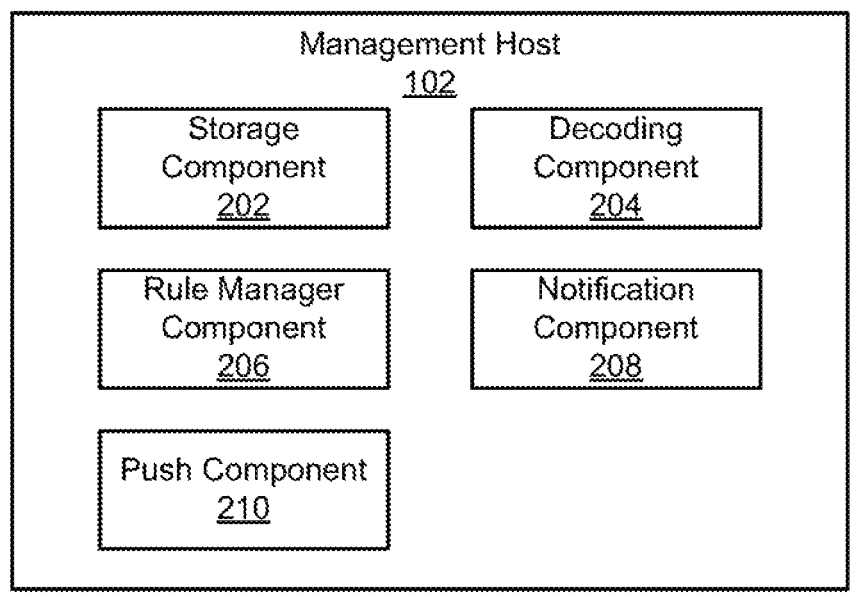
FIG. 2 is a schematic block diagram illustrating example components of a management host, according to one implementation.

FIG. 2 is schematic a block diagram illustrating example components of a management host 102. In the depicted embodiment, the management host 102 includes a storage component 202, a decoding component 204, a rule manager component 206, a notification component 208, and a push component 210. The components 202-210 are given by way of illustration only and may not all be included in all embodiments. In fact, some embodiments may include only one or any combination of two or more of the components 202-210, without limitation. Some of the components 202-210 may be located outside the management host 102 on different systems or machines or the management host 102 may include a plurality of different machines or systems that include one or more of the components 202-212.

The storage component 202 is configured to store a list of expected connections for a plurality of networked machines, such as the managed computing system 104 of FIG. 1. In one embodiment, each connection in the list of expected connections defines a start point and an end point for the connection. The list of expected connections may be stored as part of a YAML file, or any other format or type of file. The list of expected connections may include keywords that define actions for the connection, such as whether a connection is external or internal only (whether it allows non-managed devices or systems to connect using that connection). In one embodiment, the list of expected connections may be stored in source control to provide version tracking for the list.

Each entry in the list may include a plurality of additional requirements for the connection, such as a protocol, a port number, and a port number range for the corresponding connection or communication. In one embodiment, the starting point and/or the end point for a connection in the list of expected connections includes a group, such as a security group. Use of groups may allow any member of that group to take part in the communication (according to the communication or connection requirements) without the member being specifically identified.

The storage component 202 may store the list of expected connections in a connections master file local to the management host 102 or may store the list on a network accessible storage location.

The decoding component 204 is configured to receive and/or decode message from one or more machines managed by the management host 102. For example, the decoding component 204 may include a network interface card (NIC), routing component, or other hardware or software to receive, decode, parse, or otherwise process messages from managed devices. The messages may include information indicating one or more connections for a corresponding machine. For example, the messages may include one or more of a current connection or a configured connection for the corresponding machine. For example, the messages may include information in a configuration file or may include information reflecting actual current communication connections of a specific machine at a specific time. In one embodiment, the messages may include a route table for a machine, configurations for a firewall, or other information about what connections are allowed or not allowed by a specific machine or system.

The rule manager component 206 is configured to determine whether connections or configurations at end-points, such as computing systems 104, comply with the list of expected connections. In one embodiment, a rule manager component 206 is configured to identify an unexpected presence or absence of a connection on at least one of the plurality of networked machines based on the list of expected connections. In one embodiment, the rule manager component 206 is configured to determine that a connection of the one or more connections for the corresponding machine is expected when there is a matching entry in the list of expected connections. In one embodiment, the rule manager component 206 is configured to identify the presence of the unexpected connection based on a connection having no matching entry in the list of expected connections. In one embodiment, the rule manager component 206 is configured to identify the unexpected absence of a connection based on an entry in the list of expected connections having no matching connection in the one or more connections for the corresponding machine.

In one embodiment, the rule manager component 206 is configured to validate the completeness and/or accuracy of communication configurations. For example, the rule manager component 206 may count a number of differences between the list of expected connections and the actual configurations of managed systems. If the number of differences is non-zero, this may mean that either the list of expected connections is inaccurate or that the end-points are incorrectly configured. In one embodiment, an administrator may be notified if there are differences and the administrator will determine whether a change needs to be made to the list of unexpected connections. The validation role performed by the rule manager component 206 may allow for a determination of whether the configuration matches the expected configuration and makes it easy for administrators to identify where any differences are. For example, it may be easily determined that all endpoints are configured in accordance with the list of expected connections within a connections master file.

In one embodiment, the rule manager component 206 is configured to enforce the expected connections in the list of expected connections. For example, the rule manager component 206 may push configurations down to each end-point based on the list of expected connections. The rule manager component 206 may translate an entry in the list into specific rules for each managed end node. For example, the rule manager component 206 may convert a rule in a YAML file into a format of a configuration file. Furthermore, the rule in the YAML file may be converted from a whole connection rule (or both ends of a communication) into a single end-point rule, for storage by a specific end-point machine. These configurations that have been pushed or sent down to the endpoints (e.g., using the push component 210) may result in deletion or addition of rules on the endpoint or may result in a replacement of all connection rules at the endpoint.

In one embodiment, the rule manager component 206 may generally operate as a validator and then, in response to input from an administrator, enforce the expected connections on the endpoints. For example, the rule manager component 206 may, periodically or in response to a command, perform validation of the configurations at endpoints. If there are differences, the rule manager component 206 may cause a message to be sent to the administrator (e.g., using the notification component 208). The administrator may then review the differences to determine if any change needs to be made to the list of expected connections. If no changes are needed the administrator may then cause the rule manager component 206 to push or enforce the changes onto any endpoints that are configured differently than required by the list of expected connections. If changes are needed, the administrator may then make change to the list of expected connections and the initiate another validation procedure and/or enforcement of the revised list.

The notification component 208 is configured to provide a notification to an administrator, managing system, or notification system. In one embodiment, the notification component 208 may provide a notification that includes an indication of the presence or absence of an unexpected connection. For example, the notification may identify a connection in the list of expected connections that is missing from a configuration of a specific system. As another example, the notification may identify a connection in a configuration of a specific system that is not in the list of expected connections stored by the management host. In one embodiment, the notification may include an indicator for the number of differences between the list of expected connections and actual connections or configurations on the plurality of machines.

In one embodiment, the notification may be provided to one or more of a log file, a notification area of a user interface, an email address, a text message, or as part of another message. As one example, the notification component 208 may provide a notification to a monitoring system. Nagios™ is one example of a monitoring system that may be used to deliver notifications. The notification may be sent to an administrator so that the administrator is apprised of the difference and can take steps to review and/or correct the discrepancy. In one embodiment, the notification component 208 is configured to flag an entry in the list of expected connections or in a configuration file of an endpoint to reflect the unexpected presence or absence of the connection.

The push component 210 is configured to provide connection rules to endpoints based on the list of expected connections stored by the storage component 202. For example, an administrator may be able to set up and/or review the list of expected connections and then cause rules to be created for each endpoint based on the list of expected connections. In one embodiment, the push component 210 is configured to add or delete connection configurations on the plurality of machines based on the list of expected connections. For example, the push component 210 may add a rule to an endpoint that is missing a rule corresponding to an entry in the list of expected connections. As another example, the push component 210 may delete a rule on an endpoint that, based on the list of expected connections, should not be there.

Figure 3:
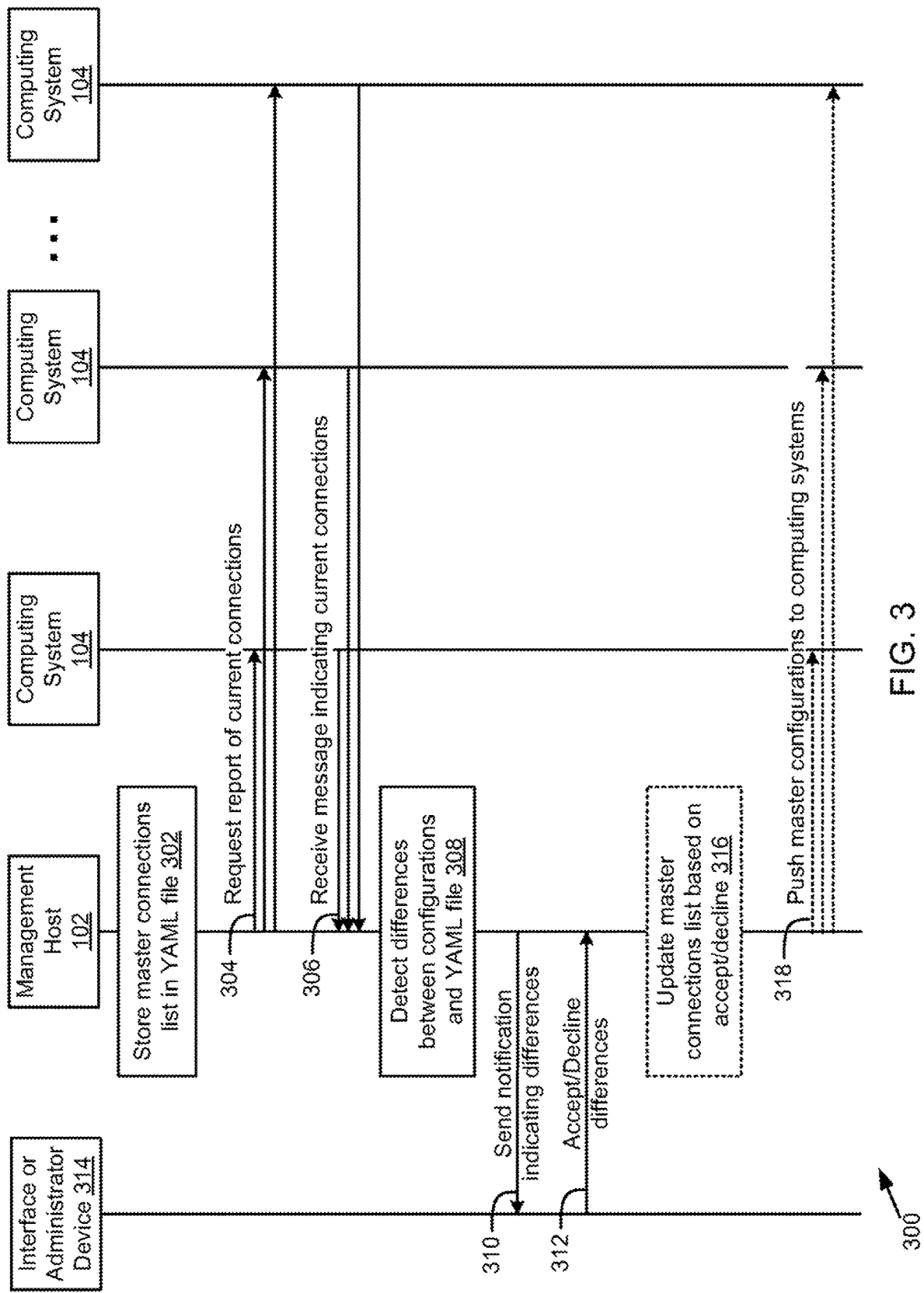
FIG. 3 is a schematic signal diagram illustrating a method for managing communication configurations at endpoints, according to one implementation.

FIG. 3 is a schematic signal diagram illustrating a method 300 for managing network connections. The method 300 may be performed by a management host 102 and one or more managed computing systems 104.

The management host 102 stores at 302 a master connections list in a YAML file. For example, the master connections list may include a list of expected connections and/or a master connections file as discussed herein. The management host 102 may store the YAML file in a version tracking and control system that tracks changes to the file and can be effectively monitored and tracked. The management host 102 requests at 304 a report of current connections from the managed computing systems 104. For example, the management host 102 may periodically send requests for current connections to monitor how managed endpoints are configured. In one embodiment, the request may include a request for connection configurations and/or actual current connections of an endpoint.

The management host 102 receives at 306 one or more messages indicating current connections at the computing systems 104. For example, managed computing systems 104 may send messages indicating current connection configurations or current communication connections. The message may indicate the current connections according to one or more different formats, such as in an iptable format, AWS™ format, or any other format. Although method 300 illustrates that the messages are received at 306 in response to a request from the management host 102, the computing systems 104 (or other endpoints) may periodically provide information about current connections autonomously or without requiring the management host 102 to send a request.

In response to receiving the messages at 306, the management host 102 detects at 308 differences between the YAML file and the current configurations or connections of the computing systems 104. For example, the management host 102 may check whether each entry in the YAML file has a corresponding entry in corresponding endpoints and check whether each entry in an endpoint configuration has a corresponding entry in the YAML file. The management host 102 may count the number of detected differences and/or flag each of the differences. The management host 102 may send at 310 a notification that indicates the differences (e.g., the number of difference and/or the flagged entries in the YAML file or in endpoint configurations). The notification may be sent at 310 to an interface or administrator device 314 where an administrator or automated service can determine how to handle the differences. For example, the administrator may be able to review each difference one by one and choose whether to except the YAML file version, the endpoint configuration version, and/or define a new rule for the YAML file or endpoint. For example, the administrator may recognize that the endpoint is configured properly, but the YAML file is missing or incorrect. On the other hand, the administrator may confirm that the YAML file is correct and the endpoint is incorrectly or improperly configured. Once the administrator has determine how to handle the differences, the administrator may indicate that the YAML file is final (or that a specific difference is accepted or declined). The interface or administrator device 314 provides at 312 the accepted or declined differences to the management host 102. For example, the accepted or declined differences sent by the interface or administrator device 314 may include input from the administrator that indicates how to handle the differences (e.g., delete a rule from a computing system 104 or add a rule to the list in the YAML file).

The management host 102 updates at 316 the connections list in the YAML file based on the accepted or declined differences received at 312, as needed. The box corresponding to updating 316 the connections list is shown with a dotted border to indicate that changes to the connections list in the YAML file may not be required based on the input received from the administrator. For example, the master connections list may only be updated if the accepted or declined differences received at 312 indicate that a rule needs to be added or deleted from the YAML file. The management host 102 pushes at 318 master configurations to the endpoints, as needed. For example the changes accepted or declined by an administrator may not require changes to the endpoint configurations or may require changes to any combination of one or more of the endpoints.

Figure 4:
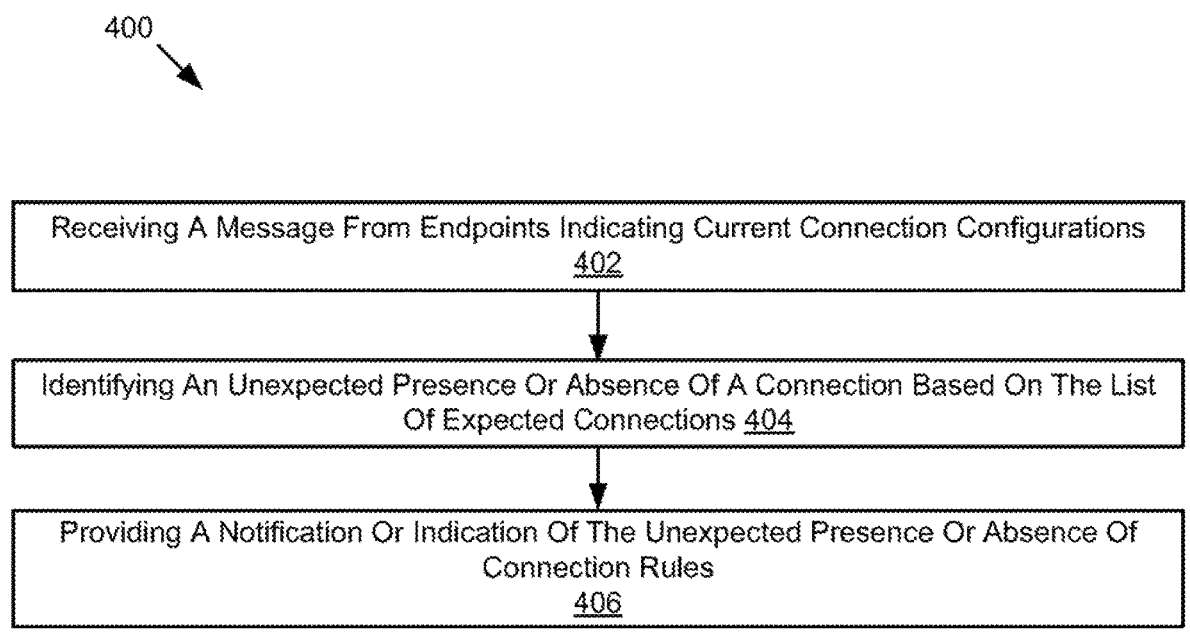
FIG. 4 is a schematic flow chart diagram illustrating a method for managing network connections, according to one implementation.

Referring now to FIG. 4, a schematic flow chart diagram of a method 400 for managing communication configurations is illustrated. The method 400 may be performed by a management host, such as the management host 102 of FIG. 1, 2, or 3.

The method 400 begins and a decoding component 204 receives messages from the plurality of networked machines indicating one or more connections for a corresponding machine at 402. A rule manager component 206 identifies at 404 an unexpected presence or absence of a connection on at least one of the plurality of networked machines based on the list of expected connections. For example, a connections master list may be compared with the current configurations of the endpoints to determine if there are unexpected connection rules or of there are rules missing from the current configurations.

A notification component 208 provides at 406 a notification or indication of the unexpected presence or absence of connections rules. The notification may be sent to a machine or interface for review by an administrator. The administrator may then take steps to correct either configurations on an endpoint or within a connections master list or list of expected connections.

Figure 5:
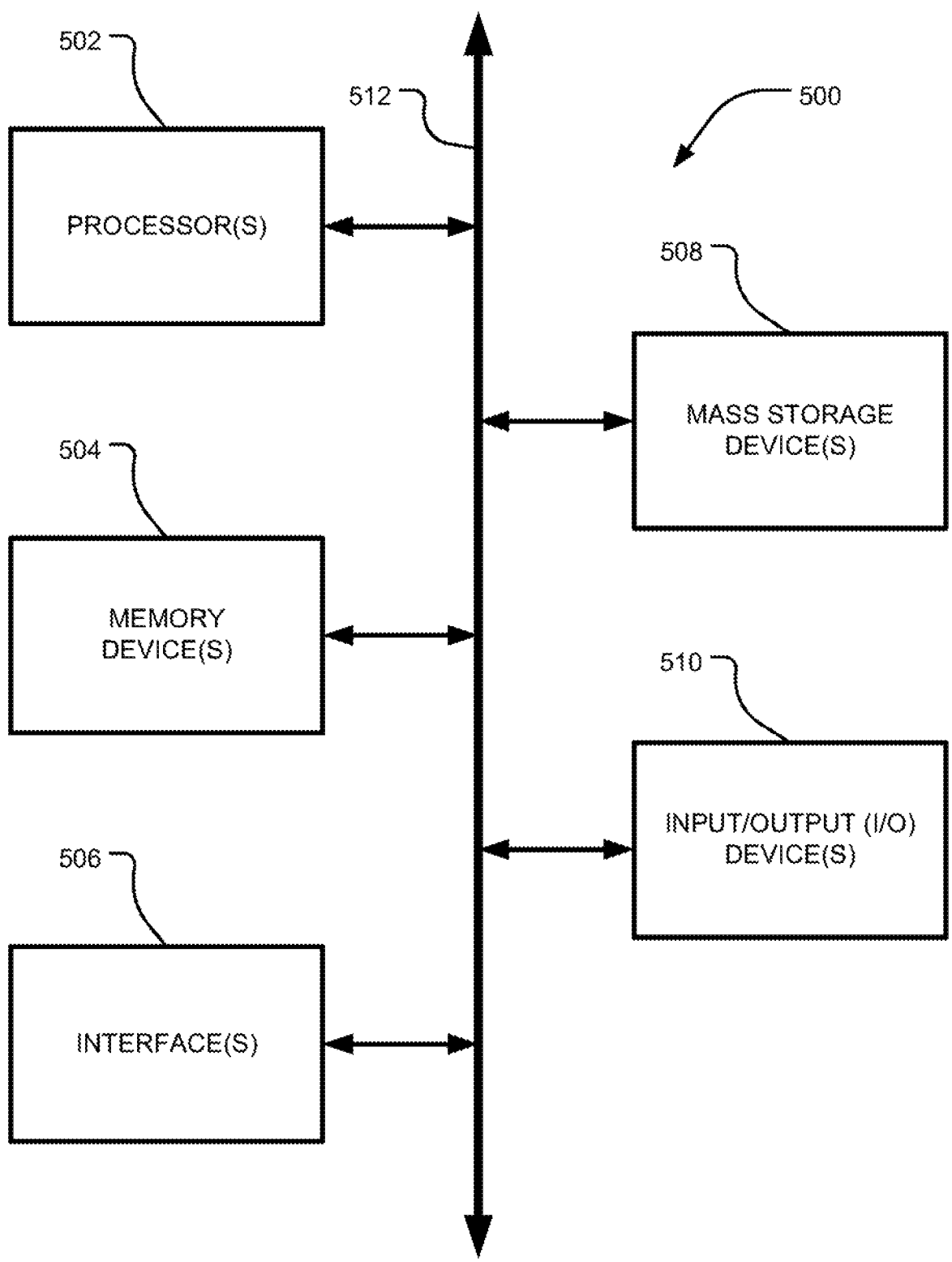
FIG. 5 is a block diagram depicting an example computing device or system consistent with the enabling disclosure of the computer processes taught herein.

FIG. 5 is a block diagram depicting an example computing device 500. In some embodiments, computing device 500 is used to implement one or more of the systems and components discussed herein. For example, computing device 500 may allow a user or administrator to access the management host 102; or the management host 102, computing systems 104, and/or external computing systems 106 may be implemented as a computing device 500 with components or modules stored as computer readable code in computer readable storage media. Further, computing device 500 may interact with any of the systems and components described herein. Accordingly, computing device 500 may be used to perform various procedures and tasks, such as those discussed herein. Computing device 500 can function as a server, a client or any other computing entity. Computing device 500 can be any of a wide variety of computing devices, such as a desktop computer, a notebook computer, a server computer, a handheld computer, a tablet, and the like.

Computing device 500 includes one or more processor(s) 502, one or more memory device(s) 504, one or more interface(s) 506, one or more mass storage device(s) 508, and one or more Input/Output (I/O) device(s) 510, all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM)) and/or nonvolatile memory (e.g., read-only memory (ROM)). Memory device(s) 504 may also include rewritable ROM, such as Flash memory.

Mass storage device(s) 508 include various computer readable media, such as magnetic tapes, magnetic disks, optical disks, solid state memory (e.g., Flash memory), and so forth. Various drives may also be included in mass storage device(s) 508 to enable reading from and/or writing to the various computer readable media. Mass storage device(s) 508 include removable media and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, or other image capture devices, and the like.

Interface(s) 506 include various interfaces that allow computing device 500 to interact with other systems, devices, or computing environments. Example interface(s) 506 include any number of different network interfaces, such as interfaces to local area networks (LANs), wide area networks (WANs), wireless networks, and the Internet.

Bus 512 allows processor(s) 502, memory device(s) 504, interface(s) 506, mass storage device(s) 508, and I/O device(s) 510 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein.

EXAMPLES

The following examples pertain to further embodiments.

Example 1 is a system for managing network connections that includes a storage component, a decoding component, a rule manager, and a notification component. The storage component is configured to store a list of expected connections for a plurality of networked machines, wherein each connection in the list of expected connections defines a start point and an end point for the connection. The decoding component is configured to decode messages from the plurality of networked machines indicating one or more connections for a corresponding machine. The rule manager component is configured to identify an unexpected presence or absence of a connection on at least one of the plurality of networked machines based on the list of expected connections. The notification component is configured to provide a notification or indication of the unexpected presence or absence.

In Example 2, the list of expected connections in Example 1 includes a list stored in a YAML file format.

In Example 3, the storage component in any of Examples 1-2 is configured to provide version tracking and control of the list of expected connections.

In Example 4, a connection in the list of expected connections in any of Examples 1-3 further includes one or more of a protocol, a port number, and a port number range for the corresponding connection.

In Example 5, one or more of the starting point and the end point for a connection in the list of expected connections in any of Examples 1-4 includes a group, such as a security group.

In Example 6, the messages in any of Examples 1-5 include one or more of a current connection or a configured connection for the corresponding machine.

In Example 7, at least one message of the messages in any of Examples 1-6 includes a route table for a machine, wherein the list of expected connections includes a master route table.

In Example 8, the rule manager component in any of Examples 1-7 is configured to determine that a connection of the one or more connections for the corresponding machine is expected when there is a matching entry in the list of expected connections.

In Example 9, the rule manager component in any of Examples 1-8 is configured to identify the unexpected presence of the connection based on a connection of the one or more connections for the corresponding machine having no matching entry in the list of expected connections.

In Example 10, the rule manager component in any of Examples 1-9 is configured to identify the unexpected absence of the connection based on an entry in the list of expected connections having no matching connection in the one or more connections for the corresponding machine.

In Example 11, the notification component in any of Examples 1-10 is configured to provide a warning to a log file or a notification area of a user interface.

In Example 12, the notification component in any of Examples 1-11 is configured to provide the notification in a message to an administrator.

In Example 13, the notification component in any of Examples 1-12 is configured to flag an entry in the list of expected connections to reflect the unexpected presence or absence of the connection.

In Example 14, the notification component in any of Examples 1-13 is configured to determine a number of differences between the list of expected connections and actual connections or configurations on the plurality of machines.

In Example 15, the system in any of Examples 1-14 further includes a push component configured to add or delete connection configurations on the plurality of machines based on the list of expected connections.

Example 16 is a method for managing network connections. The method includes storing a list of expected connections for a plurality of networked machines, wherein each connection in the list of expected connections defines a start point and an end point for the connection. The method includes receiving an indication from the plurality of networked machines indicating one or more connections for a respective machine. The method includes identifying an unexpected presence or absence of a connection on at least one of the plurality of networked machines based on the list of expected connections. The method further includes providing a notification or indication of the unexpected presence or absence.

In Example 17, the list of expected connections in Example 16 includes a list stored in a YAML file format.

In Example 18, the method in any of Examples 16-17 further includes providing version tracking and control of the list of expected connections.

In Example 19, a connection in the list of expected connections in any of Examples 16-18 further includes one or more of a protocol, a port number, and a port number range for the corresponding connection.

In Example 20, one or more of the starting point and the end point for a connection in the list of expected connections in any of Examples 16-19 includes a group, such as a security group.

In Example 21, the messages in any of Examples 16-20 include one or more of a current connection or a configured connection for the corresponding machine.

In Example 22, at least one message of the messages in any of Examples 16-21 includes a route table for a machine, wherein the list of expected connections includes a master route table.

In Example 23, determining that a connection of the one or more connections for the corresponding machine is expected in any of Examples 16-22 includes determining that there is a matching entry in the list of expected connections.

In Example 24, determining that a connection of the one or more connections for the corresponding machine is unexpectedly present in any of Examples 16-23 includes determining that a connection of the one or more connections for the corresponding machine includes no matching entry in the list of expected connections.

In Example 25, determining that a connection of the one or more connections for the corresponding machine is unexpectedly absent in any of Examples 16-24 includes determining that an entry in the list of expected connections includes no matching connection in the one or more connections for the corresponding machine.

In Example 26, providing the notification in any of Examples 16-25 includes providing a warning to a log file or a notification area of a user interface.

In Example 27, providing the notification in any of Examples 16-26 includes providing the notification in a message to an administrator.

In Example 28, providing the notification in any of Examples 16-27 includes flagging an entry in the list of expected connections to reflect the unexpected presence or absence of the connection.

In Example 29, the method in any of Examples 16-28 further includes determining a number of differences between the list of expected connections and actual connections or configurations on the plurality of machines.

In Example 30, the method in any of Examples 16-29 further includes adding or deleting connection configurations on the plurality of machines based on the list of expected connections.

Example 31 is a system or device that includes one or a plurality of means for implementing a method or realizing a system or apparatus as in any of Examples 1-30.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the embodiments discussed above may comprise computer hardware, software, firmware, or any combination thereof to perform at least a portion of their functions. For example, a module may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
    storing a master connection file comprising a list of desired connections for a plurality of networked resources, wherein each connection in the master connection file defines a first resource and a second resource between which the connection exists;
    obtaining, for each of one or more of the plurality of networked resources, a connection indication file indicating one or more actual connections maintained by the networked resource;
    detecting one or more differences between the master connection file and the actual connections maintained by the one or more of the plurality of networked resources by comparing at least one entry in the master connection file with the one or more actual connections of each networked resource as indicated by a connection indication file of each networked resource; and
    providing a notification of any detected differences between the master connection file and the actual connections maintained by the one or more of the plurality of networked resources indicated by the connection indication file, wherein each detected difference indicates an unauthorized connection or an inaccuracy of the master connection file.

2. The method of claim 1, wherein the master connection file comprises a file stored based on a data serialization standard.

3. The method of claim 1, further comprising providing version tracking and control of the master connection file.

4. The method of claim 1, further comprising determining, based on one or more detected differences between the master connection file and the connection indication file maintained by the one or more of the plurality of networked components, whether the master connection file is inaccurate.

5. The method of claim 1, further comprising determining, based on one or more detected differences between the master connection file and the connection indication file maintained by the one or more of the plurality of networked components, whether one or more of the actual connections are unauthorized.

6. The method of claim 1, wherein a connection in the master connection file further comprises one or more of a protocol, a port number, or a port number range for the corresponding connection.

7. The method of claim 1, wherein one or more of the first resource or the second resource in the master connection file comprises a security group.

8. The method of claim 1, wherein detecting a difference between the master connection file and the connection indication file comprises determining that one or more of the actual connections maintained by the networked resource have no matching connection in the master connection file.

9. The method of claim 1, wherein detecting a difference between the master connection file and the actual connections maintained by a networked resource of the plurality of networked resources comprises determining that none of the desired connections in the master connection file have a matching entry in the connection indication file.

10. A system comprising:
    a memory to store a master connection file comprising a list of desired connections for a plurality of networked resources, wherein each connection in the connection file defines a first resource and a second resource between which the connection exists; and
    a processor, operatively coupled to the memory, the processor to:
        obtain, for each of one or more of the plurality of networked resources, a connection indication file indicating one or more actual connections maintained by the networked resource;
        detect one or more differences between the master connection file and the actual connections maintained by the one or more of the plurality of networked resources by comparing at least one entry in the master connection file with the one or more actual connections of each networked resource as indicated by a connection indication file of each networked resource; and
        provide a notification of any detected differences between the master connection file and the actual connections maintained by the one or more of the plurality of networked resources indicated by the connection indication file, wherein each detected difference indicates an unauthorized connection or an inaccuracy of the master connection file.

11. The system of claim 10, wherein the master connection file comprises a file stored based on a data serialization standard.

12. The system of claim 10, wherein the processor is further to provide version tracking and control of the master connection file.

13. The system of claim 10, wherein the processor is further to determine, based on one or more detected differences between the master connection file and the connection indication file maintained by the one or more of the plurality of networked components, whether the master connection file is inaccurate.

14. The system of claim 10, wherein the processor is further to determine, based on one or more detected differences between the master connection file and the connection indication file maintained by the one or more of the plurality of networked components, whether one or more of the actual connections are unauthorized.

15. The system of claim 10, wherein a connection in the master connection file further comprises one or more of a protocol, a port number, or a port number range for the corresponding connection.

16. The system of claim 10, wherein one or more of the first resource or the second resource in the master connection file comprises a security group.

17. The system of claim 10, wherein to detect a difference between the master connection file and the connection indication file the processor is to determine that one or more of the actual connections maintained by the networked resource have no matching connection in the master connection file.

18. The system of claim 10, wherein to detect a difference between the master connection file and the actual connections maintained by a networked resource of the plurality of networked resources the processor is to determine that none of the desired connections in the master connection file have a matching entry in the connection indication file.

19. A non-transitory computer readable medium having instructions stored thereon that, when executed by one or more processors, cause the one or more processors to:
   store a master connection file comprising a list of desired connections for a plurality of networked resources, wherein each connection in the connection file defines a first resource and a second resource between which the connection exists;
   obtain, for each of one or more of the plurality of networked resources, a connection indication file indicating one or more actual connections maintained by the networked resource;
   detect one or more differences between the master connection file and the actual connections maintained by the one or more of the plurality of networked resources by comparing at least one entry in the master connection file with the one or more actual connections of each networked resource as indicated by a connection indication file of each networked resource; and
   provide a notification of any detected differences between the master connection file and the actual connections maintained by the one or more of the plurality of networked resources indicated by the connection indication file, wherein each detected difference indicates an unauthorized connection or an inaccuracy of the master connection file.

20. The non-transitory computer readable medium of claim 19, wherein the master connection file comprises a file stored based on a data serialization standard.

21. The non-transitory computer readable medium of claim 19, wherein the processor is further to provide version tracking and control of the master connection file.

22. The non-transitory computer readable medium of claim 19, wherein the processor is further to determine, based on one or more detected differences between the master connection file and the connection indication file maintained by the one or more of the plurality of networked components, whether the master connection file is inaccurate.

23. The non-transitory computer readable medium of claim 19, wherein the processor is further to determine, based on one or more detected differences between the master connection file and the connection indication file maintained by the one or more of the plurality of networked components, whether one or more of the actual connections are unauthorized.

24. The non-transitory computer readable medium of claim 19, wherein a connection in the master connection file further comprises one or more of a protocol, a port number, or a port number range for the corresponding connection.

25. The non-transitory computer readable medium of claim 19, wherein one or more of the first resource or the second resource in the master connection file comprises a security group.

26. The non-transitory computer readable medium of claim 19, wherein to detect a difference between the master connection file and the connection indication file the processor is to determine that one or more of the actual connections maintained by the networked resource have no matching connection in the master connection file.

27. The non-transitory computer readable medium of claim 19, wherein to detect a difference between the master connection file and the actual connections maintained by a networked resource of the plurality of networked resources the processor is to determine that none of the desired connections in the master connection file have a matching entry in the connection indication file.

* * * * *

UNITED STATES PATENT AND TRADEMARK OFFICE
CERTIFICATE OF CORRECTION

| | |
|---|---|
| PATENT NO. | : 10,764,332 B1 |
| APPLICATION NO. | : 16/857174 |
| DATED | : September 1, 2020 |
| INVENTOR(S) | : Armstrong et al. |

It is certified that error appears in the above-identified patent and that said Letters Patent is hereby corrected as shown below:

In the Specification

In Column 1, Line 8, please replace "This application is" with --This application is a continuation of U.S. patent application Ser. No. 16/778,797, filed on Jan. 31, 2020, which is--

In Column 2, Line 17, please replace "hi" with --in--

Signed and Sealed this
Thirteenth Day of June, 2023

Katherine Kelly Vidal
*Director of the United States Patent and Trademark Office*